(12) United States Patent
Jitaru

(10) Patent No.: US 10,205,398 B2
(45) Date of Patent: Feb. 12, 2019

(54) VERY HIGH EFFICIENCY ONE STAGE ISOLATED POWER FACTOR CORRECTION CIRCUIT

(71) Applicant: Ionel Jitaru, Tucson, AZ (US)

(72) Inventor: Ionel Jitaru, Tucson, AZ (US)

(73) Assignee: ROMPOWER TECHNOLOGY HOLDINGS, LLC, Milford, DE (US)

( * ) Notice: Subject to any disclaimer, the term of this patent is extended or adjusted under 35 U.S.C. 154(b) by 0 days.

(21) Appl. No.: 15/463,856

(22) Filed: Mar. 20, 2017

(65) Prior Publication Data
US 2017/0271993 A1 Sep. 21, 2017

Related U.S. Application Data

(60) Provisional application No. 62/310,702, filed on Mar. 19, 2016.

(51) Int. Cl.
*H02M 3/335* (2006.01)
*H02M 1/42* (2007.01)
*H02M 1/00* (2006.01)

(52) U.S. Cl.
CPC ..... *H02M 3/33576* (2013.01); *H02M 1/4225* (2013.01); *H02M 2001/007* (2013.01); *H02M 2001/009* (2013.01); *Y02B 70/126* (2013.01)

(58) Field of Classification Search
CPC ......... H02M 3/33507; H02M 3/33569; H02M 3/3385; H02M 3/335; H02M 3/33538; H02M 3/33523; H02M 3/33515; H02M 3/33592; H02M 3/33576; H02M 3/33561; H02M 3/33546; H02M 3/156; H02M 3/135; H02M 3/137; H02M 3/157; H02M 3/1584; H02M 3/3384; H02M 2007/4815; H02M 2001/0025; H02M 2001/0032; H02M 7/219; H02M 7/217; H02M 7/068; H02M 7/06; H02M 7/10; H02M 7/7575; H02M 7/537; H02M 7/003; H02M 7/5387; H02M 7/53871; H02M 7/538; H02M 7/53835;

(Continued)

(56) References Cited

U.S. PATENT DOCUMENTS

2005/0068792 A1* 3/2005 Yasumura ............... H01F 30/04
363/21.06
2006/0139970 A1* 6/2006 Cheng ................. H02M 3/3372
363/24

(Continued)

*Primary Examiner* — Kyle J Moody
*Assistant Examiner* — Kevin H Sprenger
(74) *Attorney, Agent, or Firm* — Yakov S. Sidorin; Quarles & Brady LLP

(57) ABSTRACT

In this invention we introduce the concept of a fundamental switching cell with complimentary switchers s and a controlled dead time which is one of the embodiments of this invention. This fundamental switching cell can be used in isolated DC-DC Converter applications and also used for totem pole bridgeless power factor correction applications. One of the main embodiments of this invention describes a circuit wherein such a fundamental switching cell is used to transfer the power across a transformer towards secondary while providing power factor correction for the input line current while extracting the energy from the line and steering the low frequency ripple of the input current towards the bulk capacitor and regulating the voltage in the secondary of the transformer.

16 Claims, 17 Drawing Sheets

(58) Field of Classification Search
CPC ........... H02M 7/5381; H02M 7/53806; H02M 7/53846; Y02B 70/1433; Y02B 70/1441; Y02B 70/126; Y02B 70/16; Y02B 70/1475
USPC ............ 363/21.02–21.11, 123–127, 131–134
See application file for complete search history.

(56) References Cited

U.S. PATENT DOCUMENTS

| | | | | |
|---|---|---|---|---|
| 2011/0103097 | A1* | 5/2011 | Wang | H02M 3/33592 363/17 |
| 2015/0124492 | A1* | 5/2015 | Fu | H02M 3/33546 363/21.02 |
| 2015/0280545 | A1* | 10/2015 | Afsharian | H02M 1/36 363/21.02 |

* cited by examiner

VERY HIGH EFFICIENCY ONE STAGE ISOLATED POWER FACTOR CORRECTION CIRCUIT

RELATED APPLICATION/CLAIM OF PRIORITY

This application is related to and claims priority from Provisional application Ser. No. 62/310,702, filed Mar. 19, 2016, and which provisional application is incorporated by reference.

INTRODUCTION

For power level under 75 W the power adapters referred also as AC-DC convertors use the general concept described in FIG. 1. It consists in a bridge input rectifier, BR1, formed by the diodes D1, D2, D3 and D4, a bulk capacitor, Cbulk, an isolated converter which regulates the output voltage Vo, across and an output capacitor Co. In most of the applications the isolated converter uses a flyback topology due to its simplicity and also due to its capability to operate efficiently over a very large input voltage range. In FIG. 2 is the block diagram of an AC-DC Converter for power level above 75 W wherein the power factor correction is required. After the power factor correction stage we have an isolated converter which processes the power across the boundary between the primary and secondary. In FIG. 1 the isolated DC-DC Converter has an input voltage range of almost 4:1 and one of the most suitable topology for such an application it is the flyback topology. In FIG. 2, wherein a power factor correction circuit is employed the DC-DC Converter has to operate from a higher input voltage regulated or with a limited input voltage range. In some application the power factor correction circuit will regulate a high voltage buss which may have a constant level. In other application the output of the power factor correction stage regulates a voltage which will vary somewhat with the primary voltage in order to increase the efficiency of the power factor correction stage. The variation of voltage level at the output of the power factor correction circuit versus the input voltage line is determined by the efficiency optimization of the entire converter. In some application the boost topology for the power factor is substituted by a buck topology increasing in this way the efficiency at the lowest voltage line and compromising the quality of the power factor which in some application it is not as critical.

THE PRESENT INVENTION IS DESCRIBED BELOW A DETAILED DESCRIPTION AND BRIEF DESCRIPTION OF THE DRAWINGS

DETAILED DESCRIPTION

Figure 3:
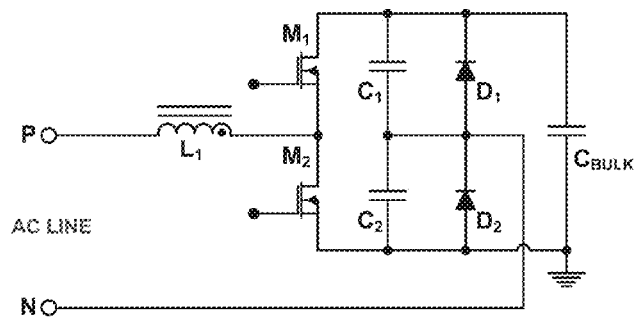
FIG. 3 depicts the simplified schematic of a totem pole bridgeless power factor correction circuit.

Analyzing the current flow in the input bridge and the boost converter it shows that during the time the energy is transferred form the AC line to the high voltage buss the current flows through two rectifiers in the input bridge and one rectifier on the boost converter. In the recent years engineers have tried to improve the efficiency of the power factor stage by creating configuration wherein the voltage drop on the input bridge rectifiers is reduced, and these structures are referred a bridgeless power factor correction topologies. In FIG. 3 is presented such a concept. In the configuration depicted in FIG. 3 is presented the schematic of such a bridgeless power factor correction referred in the field also as a bridgeless totem pole power factor circuit. This structure is presented in details in (a) provisional patent application "Bridgeless PFC using single sided high frequency switching" Provisional application No. 61/901,321, (b) U.S. Non Provisional application Ser. No. 14/535,000 which was filed Nov. 6, 2014, claimed priority to Provisional application No. 61/901,321 (U.S. Non Provisional application Ser. No. 14/535,000 has been published Nov. 5, 2015 as published application number 20150318780), and (c) provisional patent application titled "Ideal Switch Bridgeless PFC" application Ser. No. 62/236,887 filed Oct. 3, 2015, and (d) U.S. Non Provisional application Ser. No. 15/284,207, entitled "Ideal Switch Bridgeless PFC", files Oct. 3, 2016, claiming priority to Provisional application Ser. No. 62/236, 887. All of the foregoing applications are incorporated by reference herein.

Figure 4:
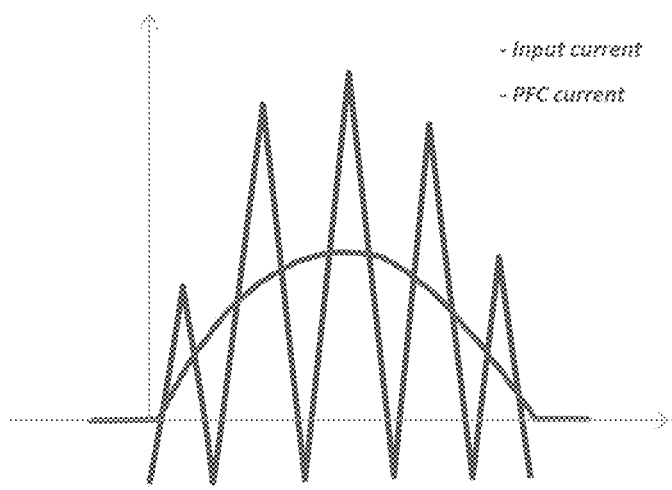
FIG. 4 depicts the input current from the line with power factor correction circuit and the current flowing through the input inductor L1 from FIG. 3.

In this topology the input current is flowing through only one low frequency rectifier and through one high frequency rectifier. In this patent application we will refer as a low frequency rectifier a rectifier means which turns on and off at low frequency such as 100-120 Hz, and high frequency rectifier an rectifier means which turn on and off at high frequency such as hundreds of Khz. In FIG. 4 is depicted the input current from the line, and the current flowing through the inductor element L1 depicted in FIG. 3. In order to achieve zero voltage switching conditions across the high frequency rectifier means, M1 and M2, the current flowing through the inductor has to be triangular shaped and has to go slightly negative. The amount of the negative current it is function of the parasitic capacitance of the high frequency rectifier means and the parasitic capacitance across the inductor element L1.

Figure 21:
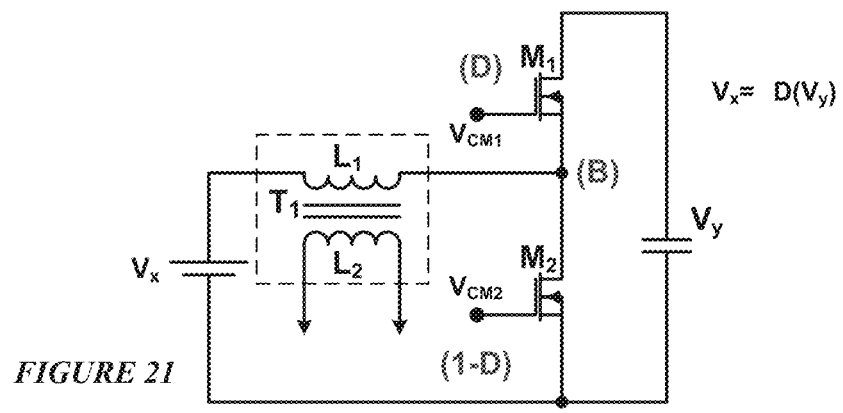
FIG. 21 depicts the fundamental switching cell composed by two complementary switching elements and an inductive element which can be a choke or a transformer.

In this invention we are offering a solution wherein we provide power factor correction by shaping the input current to match the input line voltage and in the same time we transfer energy across the isolation boundaries in the secondary without the low frequency current ripple which is being steered toward the Cbulk. The key structure in this invention it is the fundamental switching cell composed by two totem pole switching elements which are complimentary to each other. When one of the switching elements conducts the other switching element is open and vice versa. The fundamental switching cell is depicted in FIG. 21. This fundamental switching cell is formed by two switching elements M1 and M2 which are placed on top of each other and controlled to be complementary to each other. In the event M1 operated with a duty cycle D, M2 does operate with a duty cycle (1-D). There is a small time of dead time in between the conduction of these switching elements. An inductive element is connected to the switching node B between the switching elements and to a voltage source Vx. The upper switch is connected to a voltage source Vy, and the lower switch to the common ground wherein the Vx and Vy are also connected. The inductor element connected between Vx and the switching node B can be a choke or can be the primary of a transformer with a primary winding L1 and a secondary winding L2. In the event M1 switches at a given frequency with a duty cycle D, the M2 will switch at the same frequency with the duty cycle (1-D) and the relation between Vx and Vy is given by the following equation, Vx=D*Vy. The power transfer from Vx and Vy can be done in both directions. In the totem pole bridgeless power factor correction depicted in FIG. 3 we have such a switch cell formed by M1, M2 and the inductor element L1. In addition to this we have two low frequency rectifier means D1 and D2 which can be regular rectifiers or Mosfets operating at low frequency and operating exactly like to diodes but with a low voltage drop in the event these two Mosfets have a low on resistance.

For a better understanding of this invention I will present several implementations of the fundamental switching cell wherein the inductive element it is a transformer.

Figure 5A:
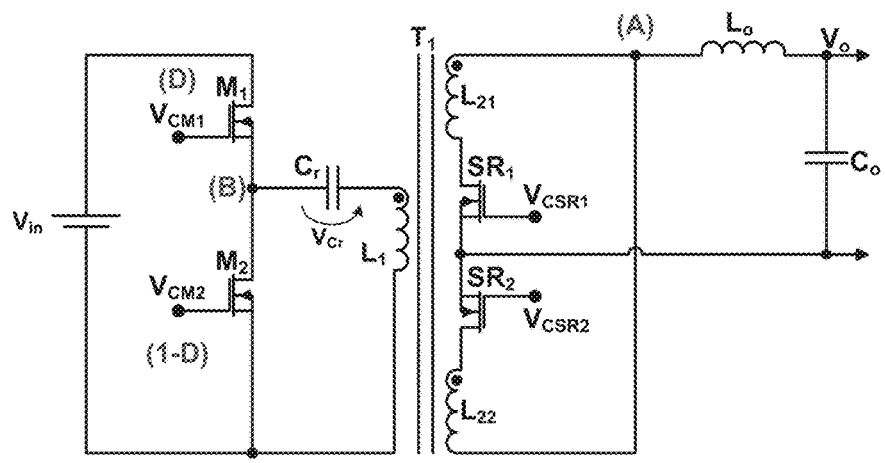
FIG. 5A depicts asymmetrical half bridge topology as an implementation of the fundamental switching cell using complimentary switchers.

In FIG. 5A is depicted an application of the fundamental switching cell in what is known in the field of power conversion as asymmetrical half bride.

This topology was described in detailed by Mr. Ionel Jitaru in the U.S. Pat. No. 5,231, 563. In the primary side of this topology we have a voltage source Vi, two complimentary switching elements M1 and M2, operating with a duty cycle D and respectively (1-D). To the switching node B we have a capacitor Cr in series with the primary winding, L1, of the transformer T1. In the secondary there are two secondary windings L21 and L22, two synchronized rectifiers and SR2 which can be replaced also with two regular diodes, an output inductor Lo and an output capacitor Co.

Figure 5B:
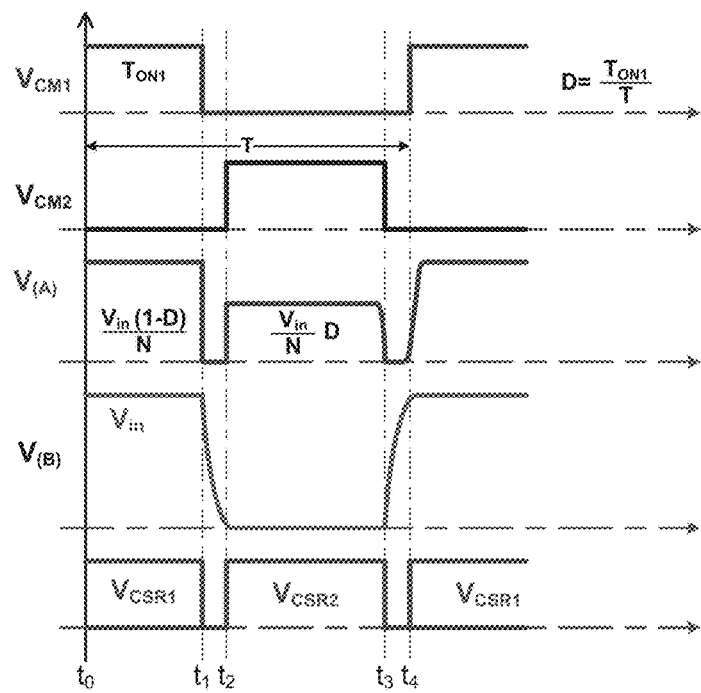
FIG. 5B depicts the key waveforms of the circuit presented in FIG. 5A.

In FIG. 5B there are depicted the key waveforms, the control signal for M1, VcM1, the control signal for M2, VcM2, the voltage in the switching node of the output inductor Lo, A, the voltage in the switching node B, and the control signals for the synchronous rectifiers SR1 and SR2.

We have identified four stages of operation:

a. At time t0, the upper switch M1 is turned and the current is flowing from the input source Vin, through Cr and the primary winding of the transformer T1. In the secondary a positive voltage at the dot end of the secondary winding L21 and L22 is induced. The current will flow through Sr1, which was turned on shortly after t0, L21 and output inductor Lo. Until t1 the power is transferred from the primary to secondary in a forward mode through the transformer T1.

b. At time t1, the upper switch M1 is turned off In the primary side the magnetizing current of the transformer T1 will discharge the parasitic capacitances of M1 and M2, creating zero voltage switching conditions across M2. In the secondary, the current starts to transfer from the secondary winding L21 towards the secondary winding L22, and continue to further flow through the output inductor Lo. Between t1 to t2 as depicted in FIG. 5B the voltage in the switching node B is decaying towards zero creating zero voltage switching conditions at turn on for M2.

c. At time t2, the lower switch M2 is turned on at zero voltage switching conditions and the current is flowing from Cr, which now became the voltage source, L1 and M2. In the secondary a voltage is induced in the secondary winding L21 and L22 with the negative voltage at the dot. In the secondary the current will flow through SR2 which was also turned on shortly after t2, 122 and output inductor Lo toward output. During this time the power is transferred from Cr towards the output in a forward mode.

d. At time t3 the bottom switch M2 is turned off. The magnetizing current in the transformer T1 will continue to flow through L1 and Cr discharging the parasitic capacitance across M1 towards zero. In the secondary, the current start to transfer from flowing through L22 to L21 and further flow through Lo. Between t3 to t4 the voltage across M1 will decay towards zero creating zero voltage switch conditions across M1.

e. At time t4 the upper switch M1 turns on at zero voltage switching conditions and the cycle will repeat again.

Figure 6:
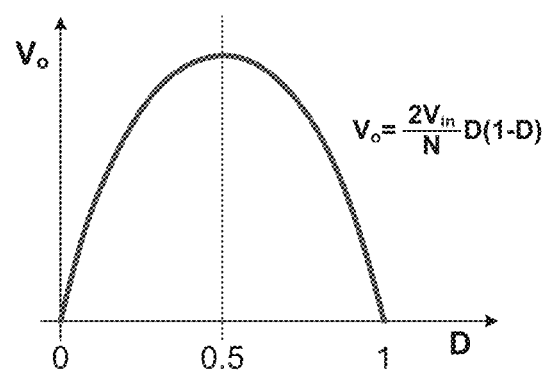
FIG. 6 depicts the transfer function of the asymmetrical half bridge.

The transfer function of this topology is presented in FIG. 6. At 50% duty cycle the transfer function has its maximum and that decays for duty cycles less than 50% or larger than 50%. Generally the operation of such a converter is done be keeping the duty cycle under 50% and decreasing it if the output voltage has to be decreased. For a very low output voltage the duty cycle has to be very small but a very small duty cycles leads to high voltage stress across the synchronous rectifiers in the secondary and that problem may also appear at turn on when the narrow duty cycle has to be avoided. One way is not to start with complementary switchers but with narrow pulses with a very large dead time in between which is similar to a regular half bridge topology. For very light load if we keep the complementary switchers feature the duty cycle will get very narrow and the operation frequency will be high which is not preferable at light load.

Figure 7A:
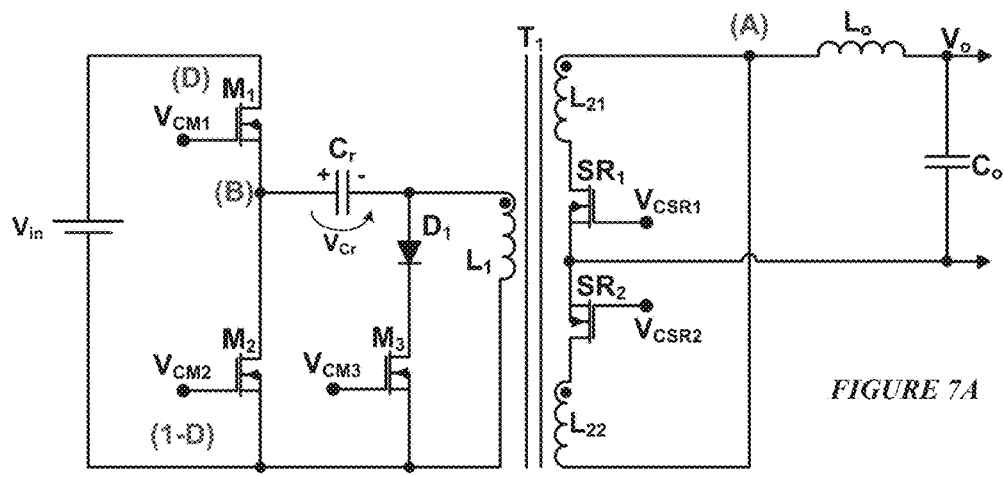
FIG. 7A depicts asymmetrical half bridge topology with the third switch for creating dead time.
Figure 7B:
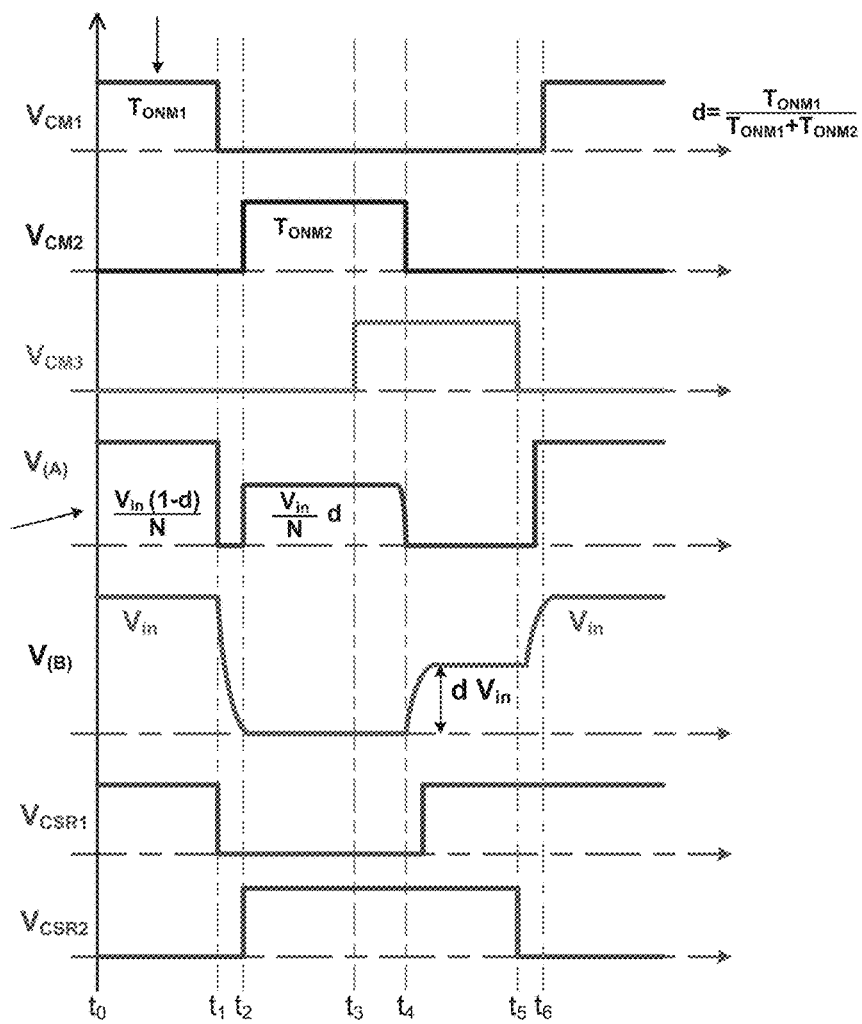
FIG. 7B depicts the key waveforms of the circuit presented in FIG. 7A.

In FIG. 7A is presented a topology wherein the problems associated with the classical asymmetrical half bride are eliminated. This is one of the embodiments of this invention. The circuit is like the one presented in FIG. 5A with the difference that we added a diode D1 and a switching element M3. The key waveforms are depicted in FIG. 7B. A new type of duty cycle d is introduced and presented in FIG. 7B.

We have identified six stages of operation:

a. At time t0, the upper switch M1 is turned and the current is flowing from the input source Vin, through Cr and the primary winding L1, of the transformer T1. In the secondary a positive voltage at the dot end of the secondary winding L21 and L22 is induced. The current will flow through Sr1, which was turned on shortly after t0, L21 and output inductor Lo. Until t1 the power is transferred from the primary to secondary in a forward mode through the transformer T1.

b. At time t1, the upper switch M1 is turned off In the primary side the magnetizing current of the transformer T1 will discharge the parasitic capacitances of M1 and M2, creating zero voltage switching conditions across M2. In the secondary the current starts to transfer from the secondary winding L21 towards the secondary winding L22, and continue to further flow through the output inductor Lo. Between t1 to t2 as depicted in FIG. 7B the voltage in the switching node B is decaying towards zero creating zero voltage switching conditions at turn on for M2.

c. At time t2, the lower switch M2 is turned on at zero voltage switching conditions and the current is flowing from Cr, which now became the d. voltage source, L1 and M2. In the secondary a voltage is induced in the secondary winding L21 and L22 with the negative voltage at the dot. In the secondary the current will flow through SR2 which was turned on shortly after t2, 122 and output inductor Lo toward output. During this time the power is transferred from Cr towards the output in a forward mode.

e. At t3 the third primary switch M3 is turned on. This has to be done prior the bottom switch M2 will be turn off at the time t4.

f. At time t4 the bottom switch M2 is turned off. The magnetizing current in the transformer T1 will continue to flow through L1 and Cr discharging the parasitic capacitance across M1. In the secondary the current start to transfer from flowing only through L22 to flowing through both, L22 and L21 and further flow through Lo. After t4, both synchronized rectifiers SR1 and SR2 will conduct between t4 to t5 the voltage in the switching node B will settle at a level which is d*Vin.

g. At time t5 the third switch M3 turns off and the magnetizing current in the transformer T1 which was shorted by M3, maintaining its amplitude will start discharging the parasitic capacitance of M1 towards zero creating zero voltage switching conditions for M1. During the time interval t4 to t5 both synchronous rectifiers were conducting and SR1 was turned on shortly after t4.

In this topology at lighter load the dead time, which is the time interval between t4 to t5 can be increased decreasing the duty cycle of energy transfer to the secondary and further the repetition frequency can be further decreased which is very suitable with light load operation. At light load is preferable to decrease the switching frequency and as the load decreases the driving losses decrease accordingly and in this way achieve a good efficiency at light load. In the same time in this topology we eliminate the turn on problem wherein the duty cycle is low. The effective duty cycle "d", can be high, even close to 50% and by modulating the time interval t4 to t5 referred also as a dead time we can control the power and eliminate the high voltage stress across the synchronized rectifiers.

Figure 1:
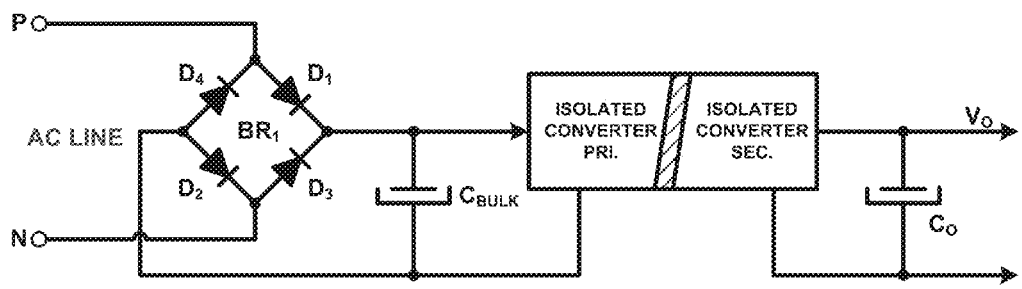
FIG. 1 is the prior art implementation of a AC-DC converter without power factor correction.
Figure 2:
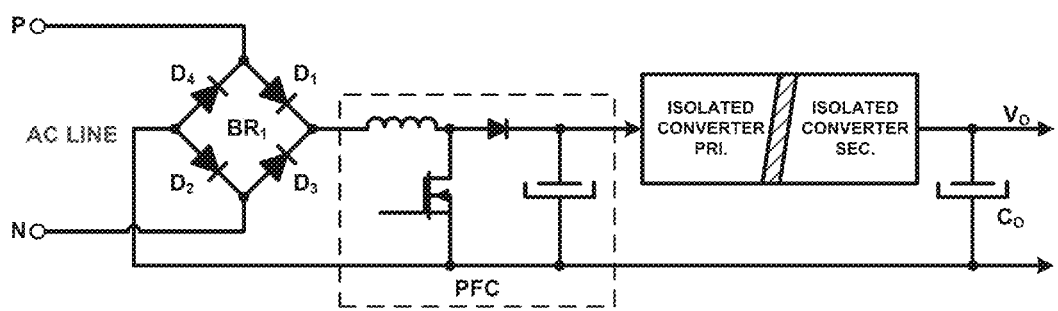
FIG. 2 is the prior art implementation of an AC-DC converter with power factor correction.

In this topology zero voltage switching can be maintained in any operating conditions and the magnetizing current which is trapped through the conduction of M3 can be maintained to a certain level to ensure zero voltage switching. This topology due to its ability to control the dead time and still preserve zero voltage switching conditions for all the switching elements can be used in many applications such as an isolated DC-DC Converter as depicted in FIG. 1, as a replacement of the flyback topology.

Though this topology does eliminate the problems associated with narrow duty cycle operation it does require an additional switch element M3.

Figure 8A:
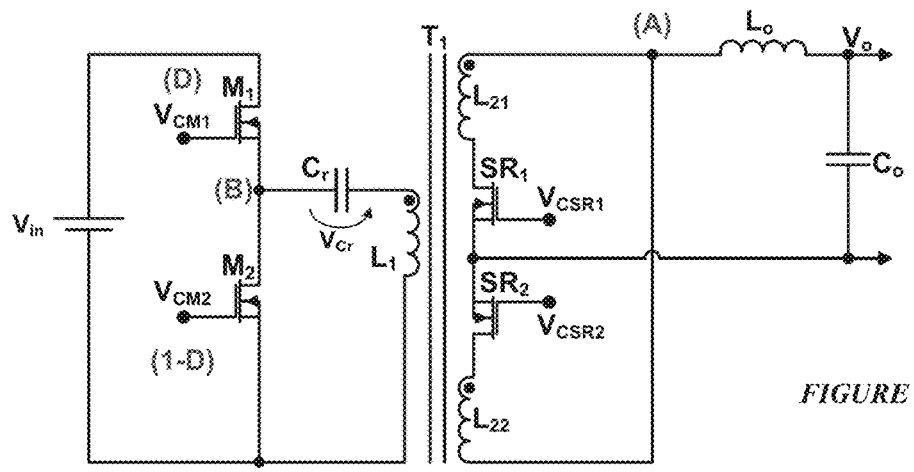
FIG. 8A depicts the asymmetrical half bride with dead time controlled by controlling the synchronous rectifier.

Another embodiment of this invention it is the circuit depicted in FIG. 8A wherein the third switch M3 is eliminated and the mode of operation associated with the circuit in FIG. 7A is maintained. That is done by moving the function of shorting the primary winding by the switch element M3 to the secondary winding and the short of the magnetizing current is done by the SR1 and SR2.

The circuit in FIG. 8A is identical with the circuit from FIG. 5A. The mode of operation is different and that is due to the control signals for the primary switchers and the secondary synchronous rectifiers.

Figure 8B:
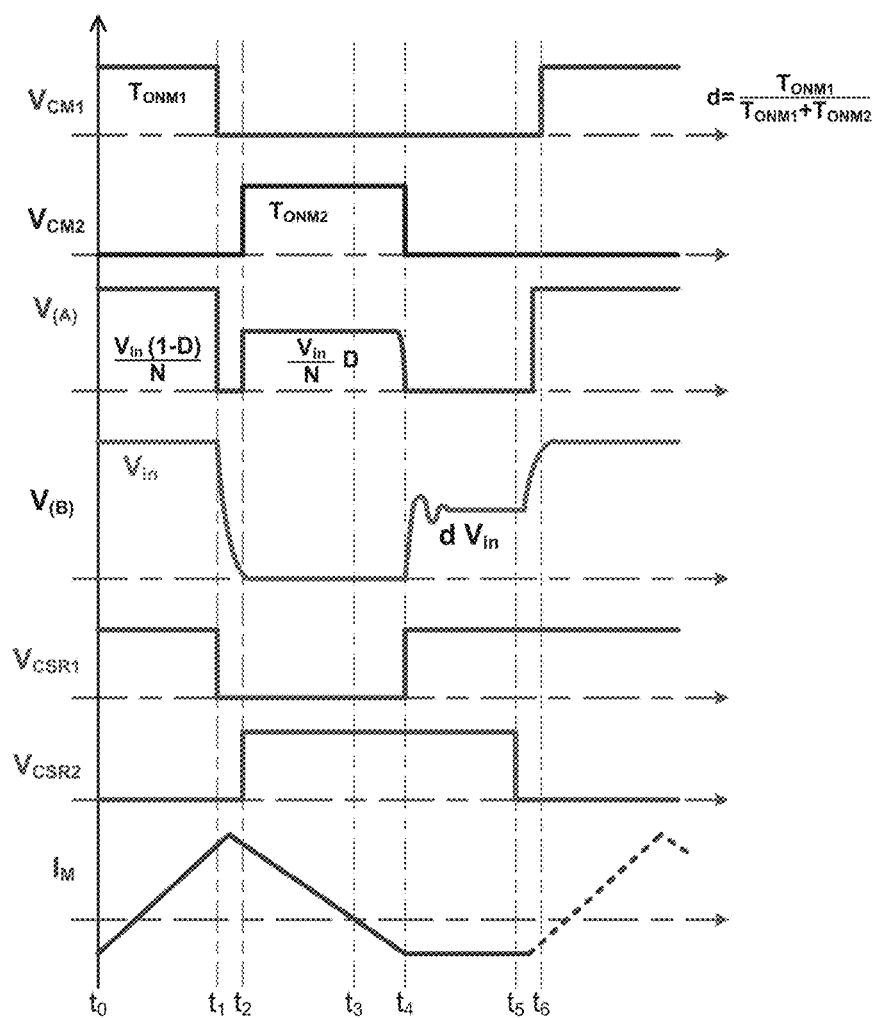
FIG. 8B depicts the key waveforms of the circuit presented in FIG. 8A.

We identified six stages of operation:

a. At time t0, the upper switch M1 is turned on and the current is flowing from the input source Vin, through Cr and the primary winding L1, of the transformer T1. In the secondary a positive voltage at the dot end of the secondary winding L21 and L22 is induced. The current will flow through Sr1, which was turned on shortly after t0, L21 and output inductor Lo. Until t1 the power is transferred from the primary to secondary in a forward mode through the transformer T1.

b. At time t1, the upper switch M1 is turned off. In the primary side the magnetizing current of the transformer T1 will discharge the parasitic capacitances of M1 and M2, creating zero voltage switching conditions across M2. In the secondary the current starts to transfer from the secondary winding L21 towards the secondary winding L22, and continue to further flow through the output inductor Lo. Between t1 to t2 as depicted in FIG. 8B the voltage in the switching node B is decaying towards zero creating zero voltage switching conditions at turn on for M2.

c. At time t2, the lower switch M2 is turned on at zero voltage switching conditions and the current is flowing from Cr, which now became the energy source, L1 and M2. In the secondary a voltage is induced in the secondary winding L21 and L22 with the negative voltage at the dot. In the secondary the current will flow through SR2 which was turned on shortly after t2, 122 and output inductor Lo toward output. During this time the power is transferred from Cr towards the output in a forward mode.

d. At time t3 the bottom switch M2 is turned off. The magnetizing current in the transformer T1 will continue to flow through L1 and Cr discharging the parasitic capacitance across M1 and M2. The voltage in the switching node B has the tendency to go toward Vin level, but the secondary windings are shorted because SR2 is on and SR1 is turned on at t3 as well. The magnetizing current in the transformer T1 which would have further discharge the parasitic capacitances across the primary switchers is shorted into the secondary winding maintaining its amplitude.

e. At time t4 the voltage in the switch node B is reaching its level of d*Vin with some ringing caused by the leakage inductance between primary to secondary of the transformer. Sometime between t3 and t4 the synchronized rectifier SR1 is turned on. Between t4 to t5 the magnetizing current in the transformer is shorted by the SR1 and SR2 maintaining its amplitude.

f. At time t5 SR2 is turned off and the magnetizing current is released in the primary and in between t5 to t6 is discharging the parasitic capacitance of M1 towards zero and creating zero voltage switching conditions for M1.

g. At time t6 the upper switch M1 is turned on at zero voltage switching conditions and the cycle repeats again.

In this topology like the one described in FIG. 7A at lighter load the dead time, which is the time interval between t4 to t5 can be increased, decreasing as a result the duty cycle of the energy transfer to the secondary. The repetition frequency can be decreased as well which is very suitable with light load operation. The same is done at turn on of the converter using this topology, keeping a relatively high duty cycle "d" and avoiding very high voltage stress conditions across the synchronous rectifiers. In this topology zero voltage switching can be maintained in any operating conditions and the magnetizing current which is trapped through the conduction of SR1 and SR2 can be maintained to a certain level to ensure zero voltage switching. This topology due to its ability to control the dead time and still preserve zero voltage switching conditions for all the switching elements can be used in many applications such as an isolated DC-DC Converter as depicted in FIG. 1, as a replacement of the flyback topology.

In FIG. 5A and 5B, and FIG. 7A and 7B and FIG. 8A and 8B we described the mode of operation for a fundamental switch cell without dead time like in FIG. 5A and with dead time such as FIG. 7A and B and FIG. 8A and 8B. In most of the applications the fundamental switching cell with dead time is used for lighter load and other conditions wherein the duty cycle D would have become too small.

Using the fundamental switching cell operating as per 5B and 8B we can create a totem pole bridgeless, one stage isolated power factor correction circuit, wherein the low frequency current ripple is steered into the bulk capacitor and the output voltage created by the secondary winding of the isolated transformer is well regulated. One implementation of this novel concept is depicted in FIG. 9.

Figure 9:
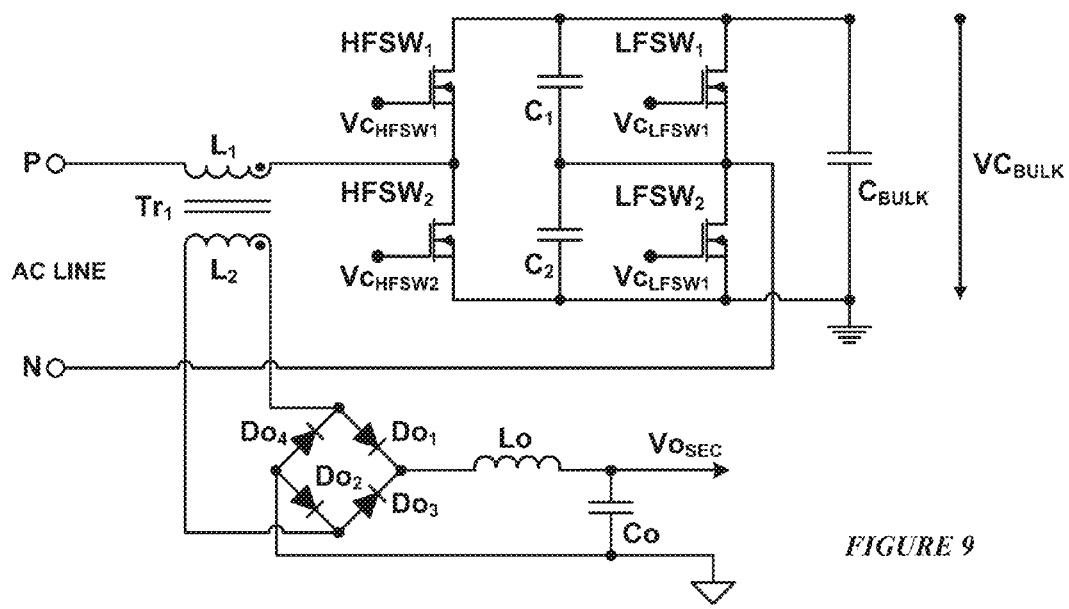
FIG. 9 depicts the circuit which is the main embodiment of this invention which achieves power factor correction, regulation of the output voltage and steering the ripple current to the bulk capacitor.
Figure 10A:
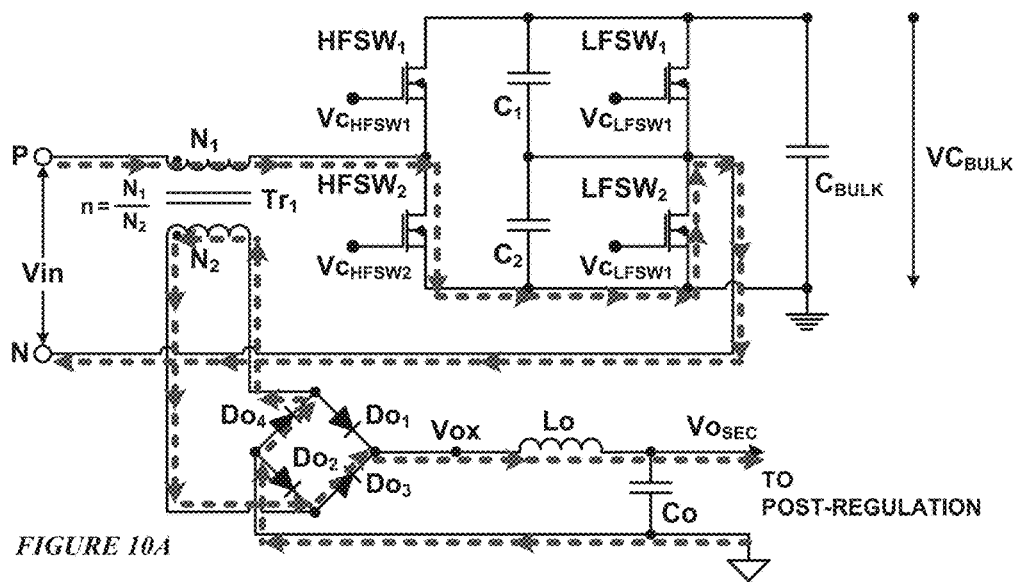
FIG. 10A depicts the current flow in the circuit presented in FIG. 9 during the t1 to t2 period.
Figure 10B:
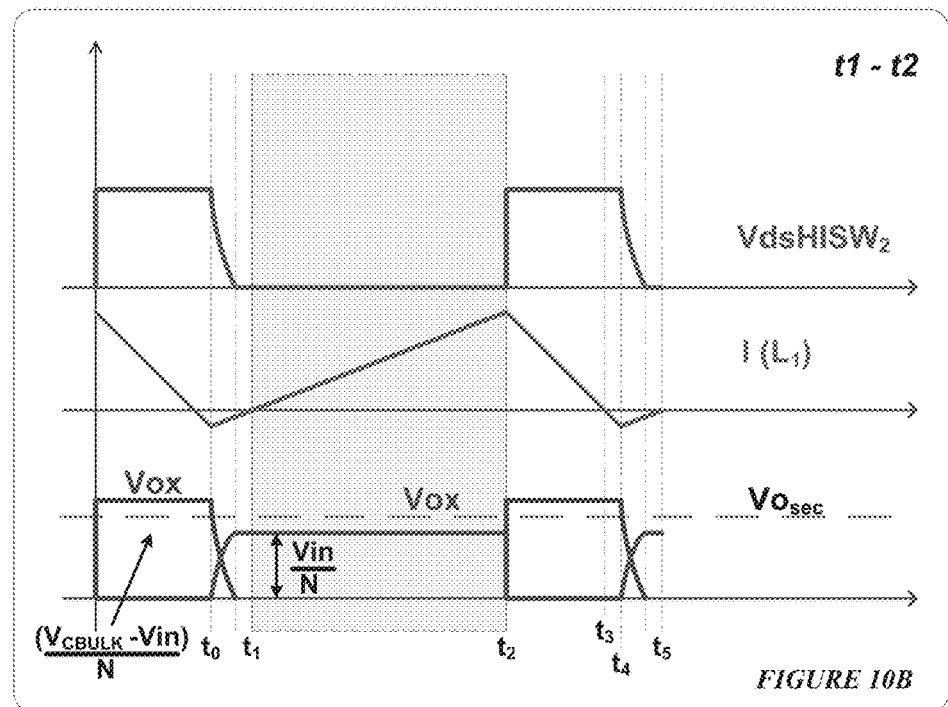
FIG. 10B depicts the key waveforms of the circuit from FIG. 10A.
Figure 11A:
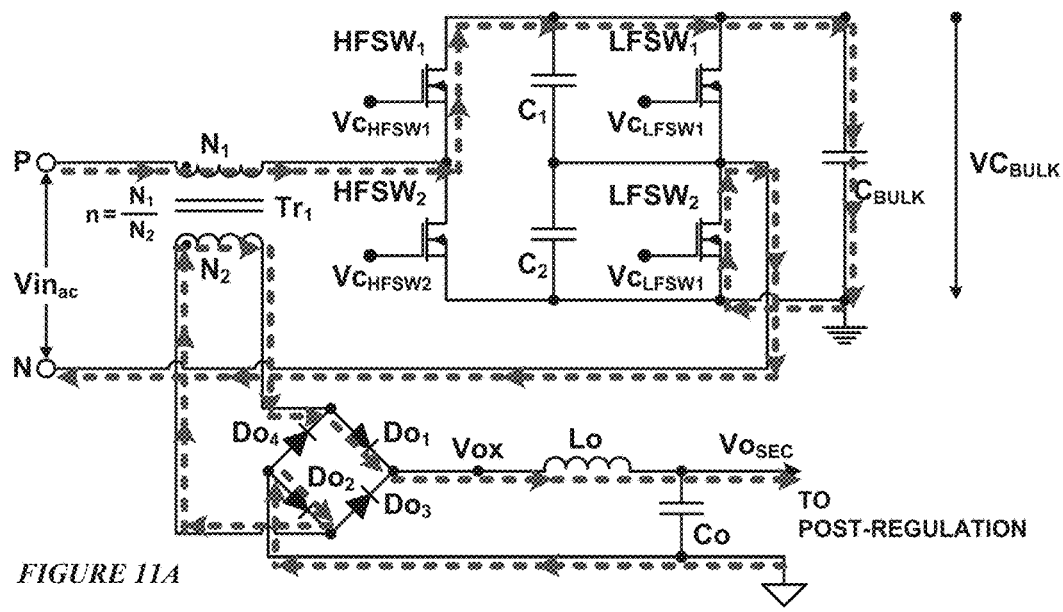
FIG. 11A depicts the current flow in the circuit presented in FIG. 9 during the t2 to t3 period.
Figure 11B:
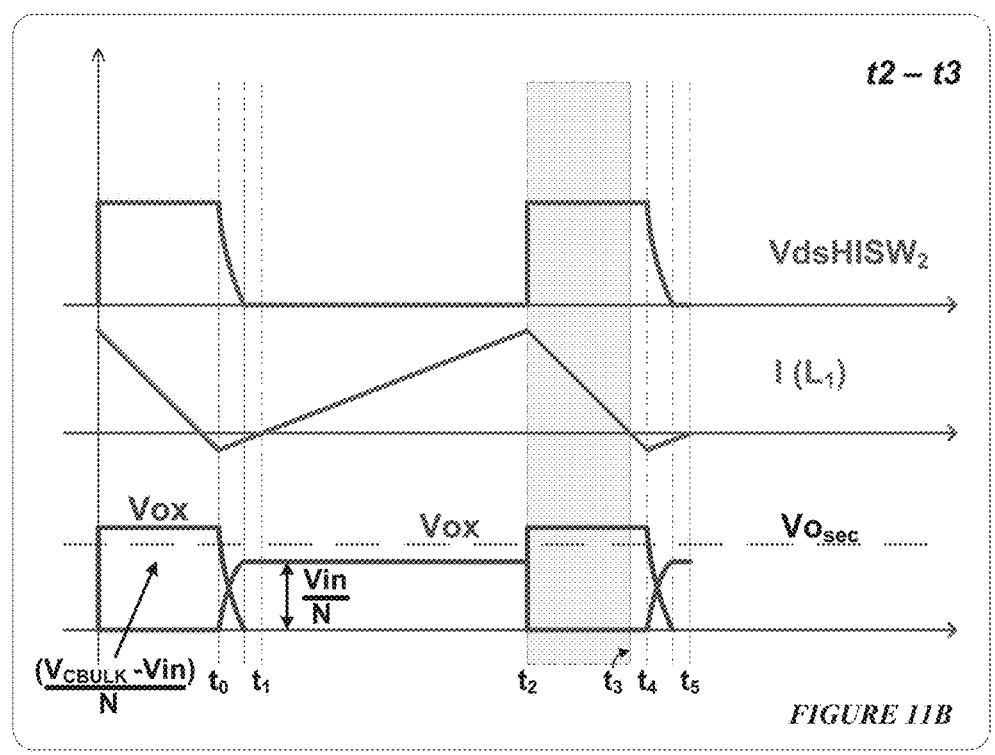
FIG. 11B depicts the key waveforms of the circuit from FIG. 11A.
Figure 12A:
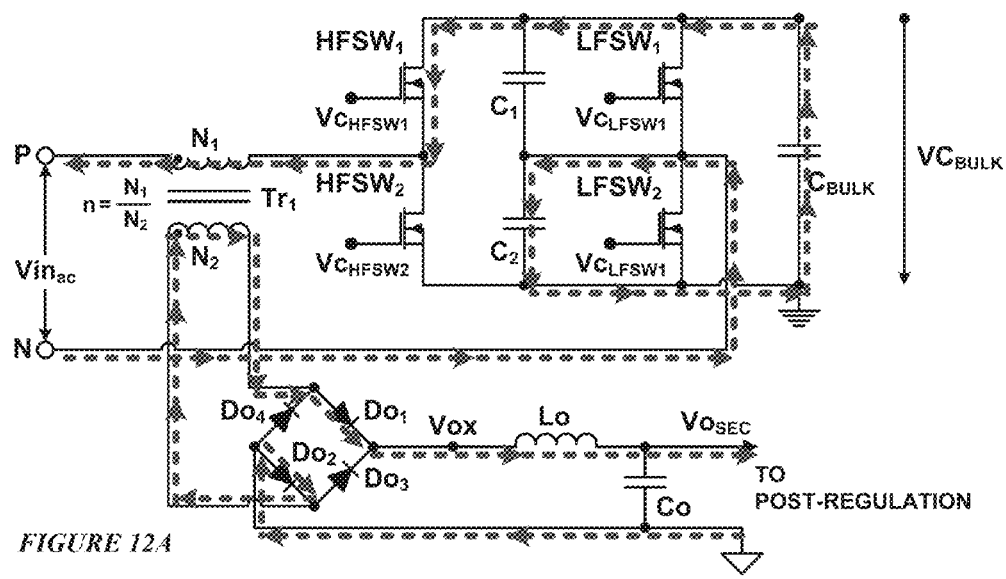
FIG. 12A depicts the current flow in the circuit presented in FIG. 9 during the t3 to t4 period.
Figure 12B:
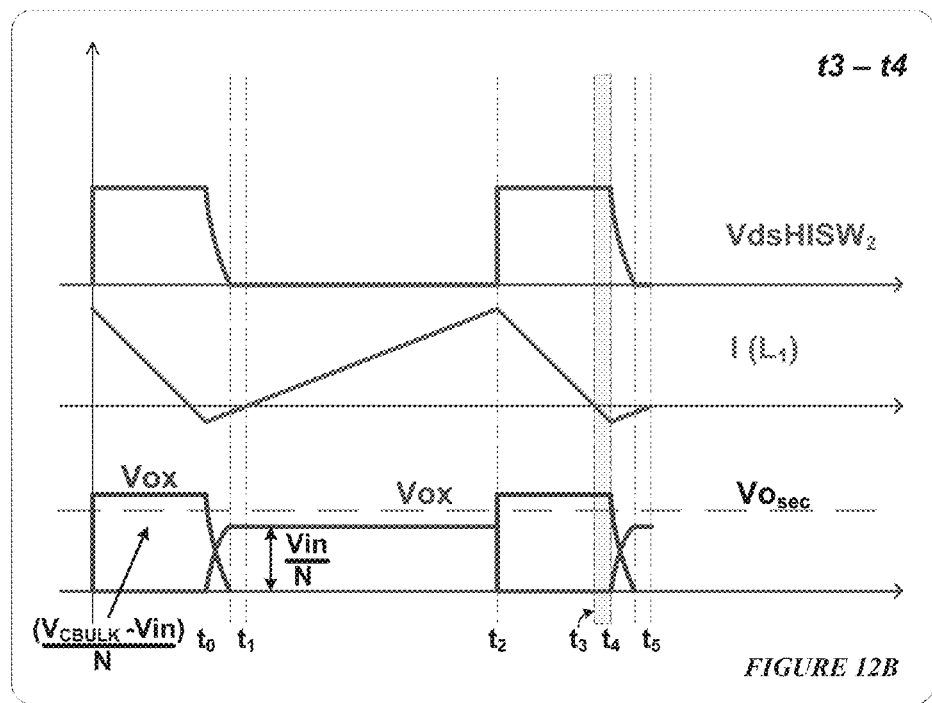
FIG. 12B depicts the key waveforms of the circuit from FIG. 12A.
Figure 13A:
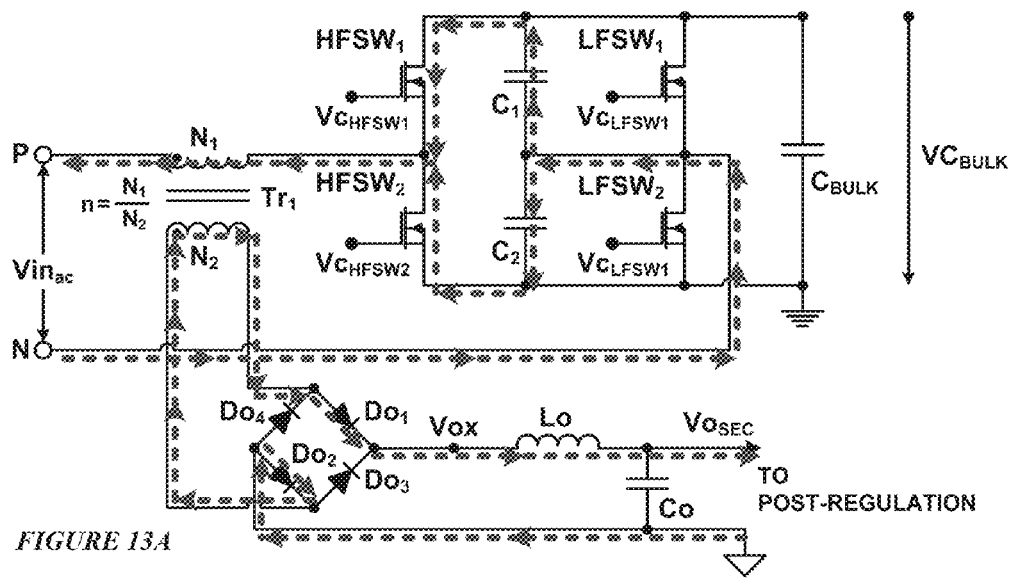
FIG. 13A depicts the current flow in the circuit presented in FIG. 9 during the t4 to t5 period.
Figure 13B:
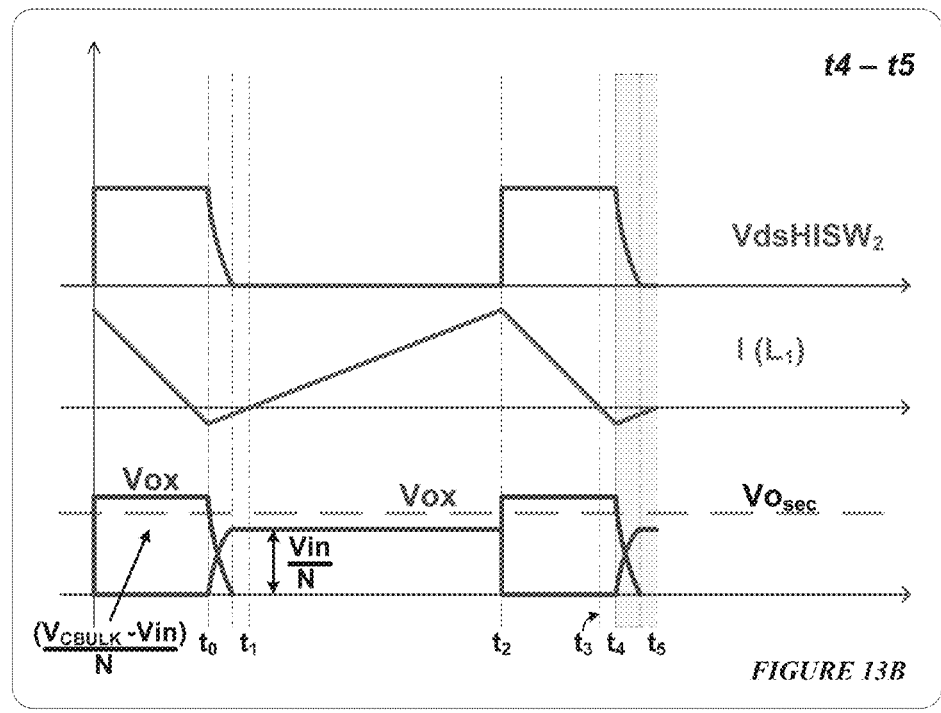
FIG. 13B depicts the key waveforms of the circuit from FIG. 13A.

In FIG. 9 we have a fundamental switching cell formed by transformer Tr1 with the primary winding L1 and a secondary winding L2, two complimentary switchers HFSW1 and HFSW2. In addition to that we have two low frequency rectifiers LFSW1 and LFSW2, two high frequency capacitors C1 and C2 and an output bulk capacitor Cbulk.

We have identified four key stages of operation for the circuit depicted in FIG. 9.

a. Stage t1 to t2. During this time interval HFSW2 and LFSW2 is on. The current flows from the phase to the neutral of the line through the primary winding of the transformer Tr1, through HFSW2, LFSW2 and back to the line neutral. During this time the current through the primary of the transformer builds up from zero to its peak, storing energy in the transformer TR1 and also transferring the energy towards the secondary through Do2 and Do4, and Lo. During this time interval the voltage Vox before the output filter is Vin/N.

b. Stage t2 to t3. During this time interval HFSW1 and LFSW2 is on. The current flows from the phase to the neutral of the line through the primary winding of the transformer Tr1, through HFSW1, to the bulk capacitor Cbulk, LFSW2 and back to the line neutral. During this time the current through the primary of the transformer decays from its peak to zero. During this time interval the entire energy stored in the transformer during the previous interval is transferred to the bulk capacitor and to secondary via Do1, Do2 and Lo. During this time interval the voltage Vox before the output filter is (Vbulk-Vin)/N.

c. Stage t3 to t4. During this time interval HFSW1 is on. The current flows from the line neutral to the phase through C2, the bulk capacitor, HFSW1 and the primary winding of the transformer Tr1. During this time the current through the primary of the transformer decays from zero to peak negative level. During this time interval the energy is delivered from the output bulk capacitor.

d. Stage t4 to t5. During this time interval HFSW1 is on. The current flows from the line neutral to the phase through C2 and C1, HFSW1 and the primary winding of the transformer Tr1. During this time the current through the primary of the transformer increases from the peak negative towards zero.

e. After t5 the cycle will repeat, for each cycle though the line voltage and the voltage across the bulk capacitor will vary. Total symmetrical the operation will continue when the line voltage will change the polarity.

The secondary of the transformer Tr1 is connected to a high frequency bridge rectifier formed by the diodes, D01, D02, D03 and D04, an output choke Lo and an output capacitor Co.

Figure 14:
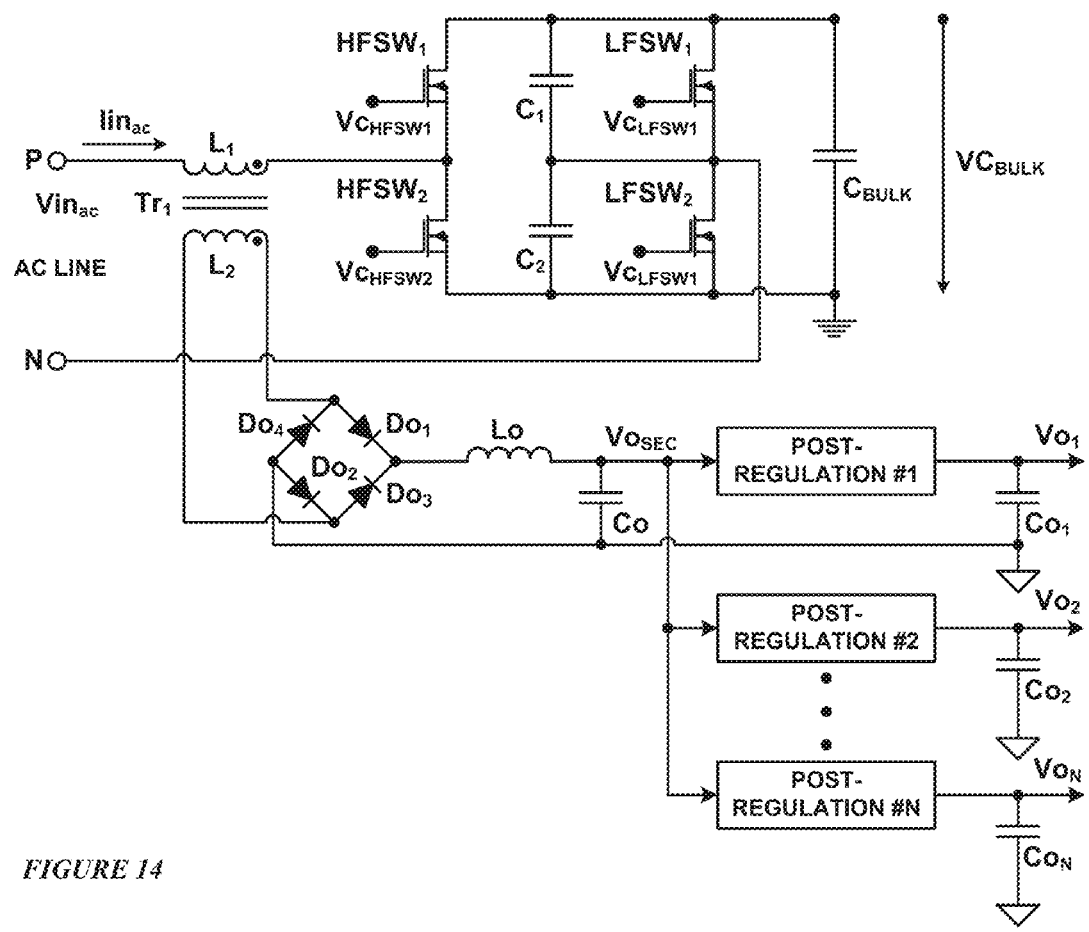
FIG. 14 depicts the circuit presented in FIG. 9 with multiple outputs.
Figure 15:
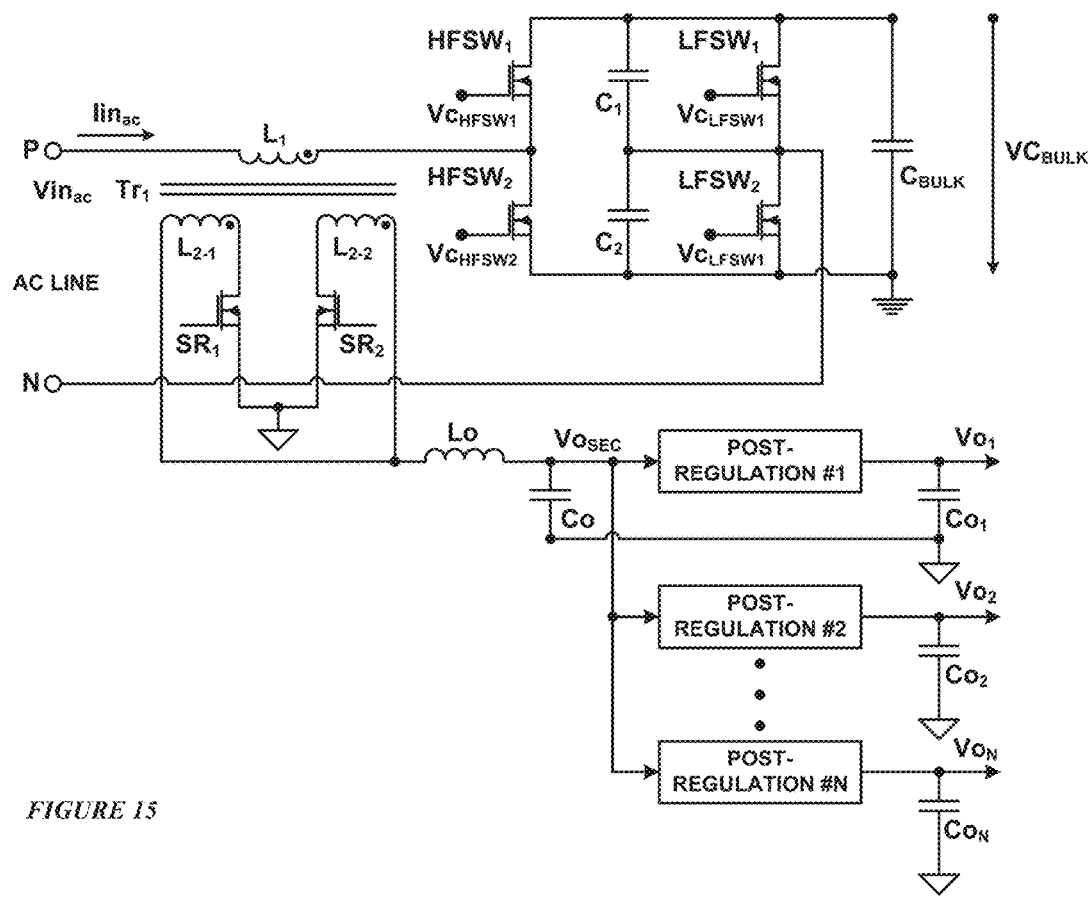
FIG. 15 depicts the circuit presented in FIG. 14 wherein we employ center tap configuration in the secondary of the transformer Tr1 and synchronous rectifiers.

In application which requires an AC-DC converter with multiple outputs one or several post regulators can be placed at the output as depicted in FIG. 14. One preferred embodiment of this invention it is the implementation from FIG. 15. In this implementation the secondary windings of Tr1 are placed to two synchronized rectifiers. In this implementation we can utilize the concept of dead time by shorting the magnetizing current of the transformer by the synchronized rectifiers into the secondary, SR1 and SR2. That would work very well when the input voltage from the ac line is close to zero voltage crossing. In another preferred embodiment the diodes from FIGS. 9 and 14 are replaced by controlled synchronized rectifiers.

In this topology like the one described in FIG. 7A at lighter load the dead time, which is the time interval between t4 to t5 can be increased, decreasing as a result the duty cycle of the energy transfer to the secondary. The repetition frequency can be decreased as well which is very suitable with light load operation. The same is done at turn on keeping a relatively high duty cycle "d" and avoiding very high voltage stress conditions across the synchronous rectifiers.

In FIG. 5A and 5B, and FIG. 7A and 7B and FIG. 8A and 8B we described the mode of operation for a fundamental switch cell without dead time like in FIG. 5A and with dead time such as FIG. 7A and B and FIG. 8A and 8B. In most of the applications the fundamental switching cell with dead time is used for lighter load and other conditions wherein the duty cycle D would have become too small.

Using the fundamental switching cell operating as per 5B and 8B we can create a totem pole bridgeless, one stage isolated power factor correction circuit, wherein the low frequency current ripple is steered into the bulk capacitor and the output voltage created by the secondary winding of the isolated transformer is well regulated. One implementation of this novel concept is depicted in FIG. 9.

In FIG. 9 we have a fundamental switching cell formed by transformer Tr1 with the primary winding L1 and a secondary winding L2, two complimentary switchers HFSW1 and HFSW2. In addition to that we have two low frequency rectifiers LFSW1 and LFSW2, two high frequency capacitors C1 and C2 and an output bulk capacitor Cbulk.

The secondary of the transformer Tr1 is connected to a high frequency bridge rectifier formed by the diodes, D01, D02, D03 and D04, an output choke Lo and an output capacitor Co.

In application which requires an AC-DC converter with multiple outputs one or several post regulators can be placed at the output as depicted in FIG. 14. One preferred embodiment of this invention it is the implementation from FIG. 15. In this implementation the secondary windings of Tr1 are placed to two synchronized rectifiers. In this implementation we can utilize the concept of dead time, depicted in FIG. 8A and 8B, by shorting the magnetizing current of the transformer by the synchronized rectifiers into the secondary, SR1 and SR2. That would work very well when the input voltage from the ac line is close to zero voltage crossing. In another preferred embodiment the diodes from FIGS. 9 and 14 are replaced by controlled synchronized rectifiers.

Figure 16:
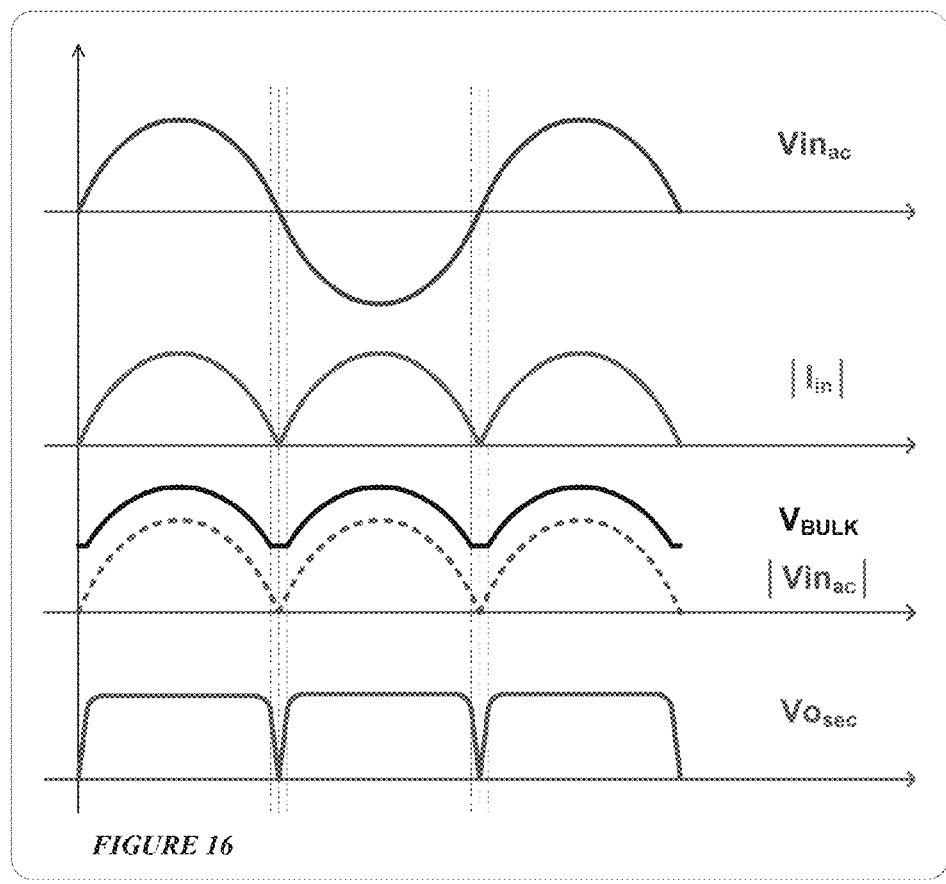
FIG. 16 depicts the key waveforms of the main embodiment of this invention presented in FIG. 9.

In FIG. 16 is depicted the ac line, the rectified input current, and the voltage across the bulk capacitor and the output voltage in the secondary of the transformer Tr1 after rectification.

Figure 17:
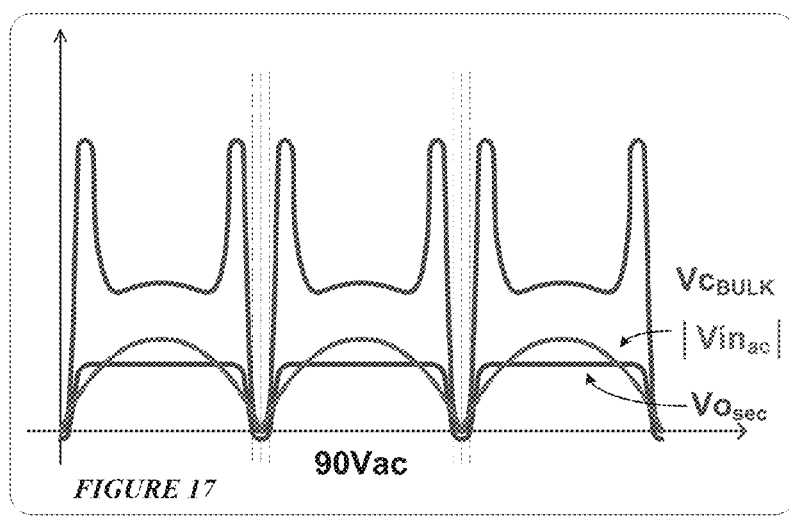
FIG. 17 depicts the rectified input voltage, the voltage on the bulk capacitor and the secondary output voltage associated with the main embodiment of this invention from Vin=90 Vac.

The main embodiment of this technology is to regulate the voltage in the secondary of the transformer after rectification, Vosec. The power is extracted from the line in a shape of $\sin^2$ but the power delivered to Vosec it shall dc. That will require that the circuit to steer the low frequency ac current towards the bulk capacitor. This means that the modulation of the duty cycle and frequency shall be done in a way that the ac current to be steered towards Vbulk and as a result the V bulk will have a certain modulation as depicted din FIG. 17. In FIG. 17 is depicted the rectified line voltage, the voltage at the output of the secondary of the transformer Vosec which shall have no low frequency ripple and the voltage across the bulk capacitor which has to have the depicted shape in order to steer the ac component of the input line current. This circuit achieves the low frequency current ripple steering towards the V bulk capacitor.

Figure 18:
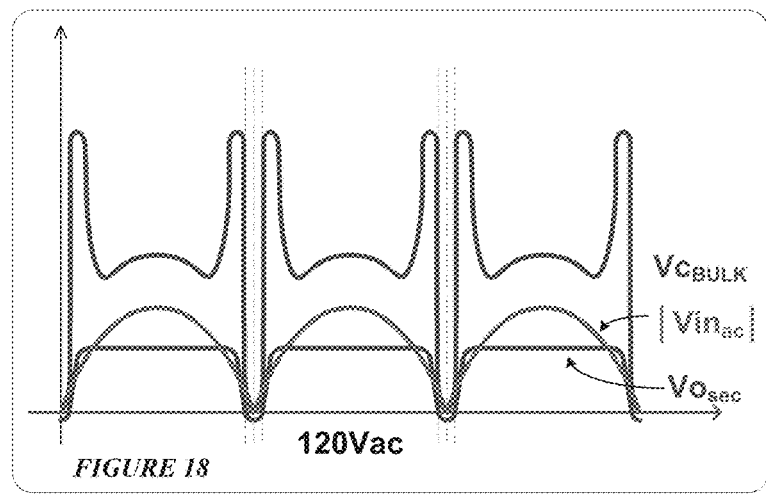
FIG. 18 depicts the rectified input voltage, the voltage on the bulk capacitor and the secondary output voltage associated with the main embodiment of this invention from Vin=120 Vac.
Figure 19:
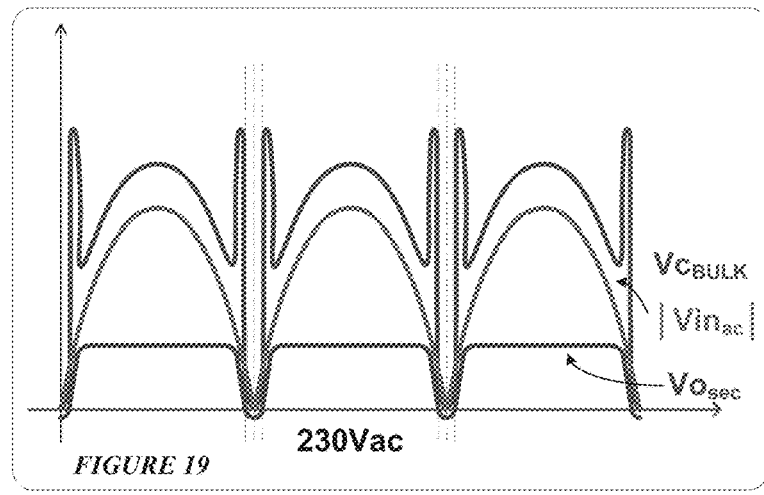
FIG. 19 depicts the rectified input voltage, the voltage on the bulk capacitor and the secondary output voltage associated with the main embodiment of this invention from Vin=230 Vac.

In FIGS. 18 and 19 shows the shape of the voltage across the bulk capacitor required in order to regulate the Vosec and steer the low frequency current ripple toward the bulk capacitor for different voltages such as 120 Vac and 230 Vac.

Figure 20:
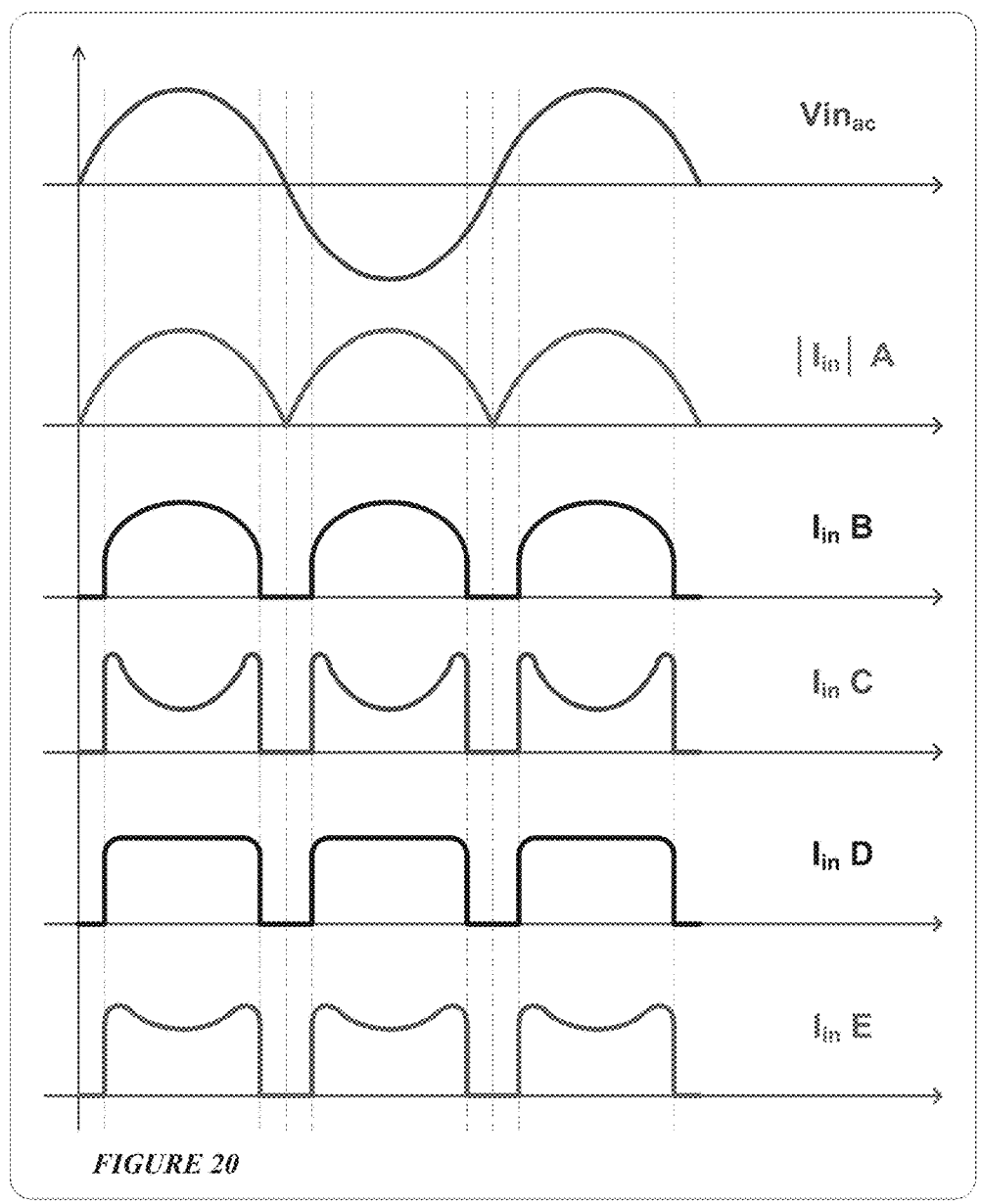
FIG. 20 depicts the rectified input voltage, and different shapes of the input current for power factor correction and quasi-power factor correction.

The input current can be sinusoidal emulating the line voltage in shape but also can have different shape as presented in FIG. 20. Different current shape may have some benefits in some applications. Regardless of the shape of the input current the modulation of duty cycle and frequency of the fundamental switching cell will be done in order to modulate the input current and steer the low frequency current ripple towards the bulk capacitor and regulate the Vosec.

The invention claimed is:

1. A method for operating a converter that includes
a primary side,
a secondary side,
on the primary side:
first and second switching elements, wherein a source of the first switching element is directly connected to a drain of the second switching element at a first node, the first node operably connected with a primary side capacitor in series with a primary side winding, wherein said primary side winding is further connected with an input voltage source and with a source of the second switching element at a second node;
on the secondary side:
first and second synchronized rectifiers, wherein a source of the first synchronized rectifier is directly connected to a source of the second synchronized rectifier at a third node, wherein a drain of the first synchronized rectifier is directly connected to an inner terminal of a first secondary side winding and a drain of the second synchronized rectifier is directly connected to an inner terminal of a second secondary side winding;
wherein the primary side winding and the first and second secondary side windings form a transformer;
the method comprising:
a) at a first moment of time, switching the first switching element "on"
to form a first current flow from the input voltage source through the primary side capacitor and the primary side winding, and
to induce a positive voltage at an outer end of the first secondary side winding and at the inner terminal of the second secondary side winding;
b) at a second moment of time, switching the first switching element "off" to create zero voltage switching conditions across the second switching element;
c) at a third moment of time, switching the second switching element "on"
to form the first current flow from the primary side capacitor, and
to induce a negative voltage at the outer terminal of the first secondary side winding and at the inner terminal of the second secondary side winding;
d) at a fourth moment of time, switching the second switching element "off"; and
e) at a fifth moment of time, switching the second synchronized rectifier "on" to short a magnetizing current of the transformer between the first and second synchronized rectifiers.

2. The method according to claim 1, further comprising switching "on" the first synchronized rectifier after the first switching element has been switched "on" to cause a second current flow through the first synchronized rectifier and an output inductor that is directly connected to i) the outer terminal of the first secondary side winding and ii) an outer terminal of the second secondary side winding at a fourth node.

3. The method according to claim 2, further comprising changing an operational status of an element on the secondary side to cause transfer of power from the primary side capacitor towards an output of the converter in a forward mode.

4. The method according to claim 2, further comprising, switching the second synchronous rectifier "on" between the third and fourth moments of time to direct said second current flow through the second synchronized rectifier, the second secondary side winding, and the output inductor.

5. The method according to claim 4, comprising choosing an inductance of said primary winding to provide a first value of an amplitude, of the magnetizing current of the transformer, needed
to discharge parasitic capacitances of the first and second switching elements between the second and third moments of time while creating zero voltage switching conditions for the second switching element; and
to discharge said parasitic capacitances of the first and second switching elements between the fourth and fifth moments of time while creating zero voltage switching conditions for the first switching element.

6. The method according to claim 5, comprising defining a first time difference between the second and first moments of time to increase said amplitude of the magnetizing current of the transformer to said first value.

7. The method according to claim 5,
wherein said method is a method for operating a DC-DC converter, and
further comprising:
defining
the first time difference,
a second time difference between the fourth and third moments of time, and
a third time difference between the sixth and fifth moments of time
to enable the DC-DC converter to cause the second current flow through the output inductor to reach a pre-determined level regardless of an amplitude of an input voltage produced by the input voltage source.

8. The method according to claim 5, comprising:
defining
the first time difference,
a second time difference between the fourth and third moments of time, and
a third time difference between the sixth and fifth moments of time, to enable the converter to reach a pre-determined level regardless of an amplitude of an input voltage produced by the input voltage source.

9. The method according to claim 1, further comprising:
transferring power from the primary side to the secondary side in a forward mode between the first and second moments of time.

10. The method according to claim 1, further comprising:
discharging parasitic capacitances of the first and second switching elements with the magnetizing current of the transformer; and
switching the second current flow from a first secondary side inductor to a second secondary side inductor.

11. The method according to claim 1, further comprising:
between the second and third moments of time, decaying a voltage at the first node towards zero to create said zero voltage switching conditions across the second switching element.

12. The method according to claim 1, further comprising:
at a sixth moment of time, switching the second synchronized rectifier "off" to release a magnetizing current of the transformer to the primary side.

13. The method according to claim 12, further comprising:
switching the first switching element "on" at zero voltage switching conditions.

14. The method according to claim 13, further comprising
after the sixth moment of time but before said switching the first switching element "on", discharging parasitic capacitance of the first switching element to create said zero voltage switching conditions for the first switching element.

15. The method according to claim 1, wherein said switching the second synchronized rectifier "on" at the fifth moment of time includes
shortening the magnetizing current of the transformer between the first and second synchronized rectifiers while maintaining an amplitude of the magnetizing current.

16. The method according to claim 1, further comprising repeating at least a), b), c), d), and e) in a cyclical fashion.

* * * * *